United States Patent Office 3,463,836
Patented Aug. 26, 1969

3,463,836
S,S-HYDROCARBYL-S-CHLOROETHYL OR CHLOROVINYL PHOSPHATES
Paul C. Aichenegg, Prairie Village, Kans., assignor to Chemagro Corporation, New York, N.Y., a corporation of New York
No Drawing. Continuation-in-part of application Ser. No. 553,022, May 26, 1966. This application June 14, 1966, Ser. No. 557,367
Int. Cl. C07d *105/04;* C07f *9/16;* A01n *9/36*
U.S. Cl. 260—937       15 Claims

ABSTRACT OF THE DISCLOSURE

Compounds are prepared having the formula

where R is trihaloethyl or dihalovinyl and $R_1$ and $R_2$ are hydrocarbon, haloaryl, haloalkyl, nitrophenyl, alkoxyphenyl or alkylthioalkyl or $R_1$ and $R_2$ are a divalent alkylene chain and are joined with the two sulfur atoms and phosphorus atom to form a 5 to 6 member ring, all halogen atoms being chlorine or bromine. The compounds are useful as defoliants, desiccants, nematocides, post emergent herbicides, fungicides, and insecticides.

---

This application is a continuation-in-part of our application Ser. No. 553,022, filed May 26, 1966, entitled "Sulphenyl and Sulfinyl Phosphoryl Dichloride."

The present invention relates to novel trithiophosphates and methods of preparing the same as well as to the use of such products as defoliants, desiccants, nematocides and post emergent herbicides.

The compounds of the present invention have the formula

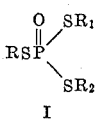
I where R is trihaloethyl or dihalovinyl, the halogen atoms having an atomic weight of 35 to 80 and $R_1$ and $R_2$ are hydrocarbon, (preferably alkyl of 1 to 6 carbon atoms, phenyl or tolyl), haloaryl, haloalkyl, nitrophenyl, alkoxyphenyl or alkythioalkyl or $R_1$ and $R_2$ are joined together in a ring with the sulfur and phosphorus atoms.

It is an object of the present invention to prepare novel trithiophosphates.

Another object is to prepare novel desiccants and defoliants.

An additional object is to prepare novel fungicides.

A further object is to prepare novel nematocides.

Yet another object is to prepare novel herbicides.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds having the formula

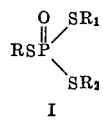
I and using them as desiccants, defoliants, herbicides, fungicides and nematocides.

The compounds of the present invention are prepared by reacting the appropriate mercaptan or thiophenol in a 2 to 1 equivalent ratio with a compound having the formula

RSPX$_2$
II where R is as previously defined and X is a halogen of atomic weight 35 to 80, preferably chlorine.

Such procedure has been found superior to making the compounds of Formula I by other methods, e.g. by reacting (a) a compound having the formula RSCl with a compound having the formula

or (b) reacting a compound having the formula RSCl with a compound having the formula

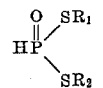

because of the ability to obtain better yields with lower amounts of impurities and contaminants.

Examples of such mercaptans are methyl mercaptan, ethyl mercaptan, propyl mercaptan, butyl mercaptan, isopropyl mercaptan, t-butyl mercaptan, hexyl mercaptan, lauryl mercaptan, cyclohexyl mercaptan, thiophenol, o-thiocresol (o-toluenethiol), m-thiocresol, p-thiocresol, 2-chloroethyl mercaptan, 2,2-dichloroethyl mercaptan, p-nitrothiophenol, m-methoxythiophenol, o-chlorothiophenol, 1,2-ethanedithiol (1,2-ethylenedithiol), 1,3-propanedithiol, propylthioethyl mercaptan, ethylthioethyl mercaptan, propylthiopropyl mercaptan.

As compounds within Formula II there can be used 1,2,2-trichloroethyl sulfenyl phosphoryl dichloride,
2,2,2-trichloroethyl sulfenyl phosphoryl dichloride,
2,2-dichlorovinyl sulfenyl phosphoryl dichloride,
1,2-dichlorovinyl sulfenyl phosphoryl dichloride,
1,2,2-tribromoethyl sulfenyl phosphoryl dibromide and
2,2-dibromovinyl sulfenyl phosphoryl dibromide.

The compounds within Formula II can be prepared as described in our above-mentioned parent application.

Examples of compounds within Formula I are

S,S-dimethyl-S-1,2,2-trichloroethyl trithiophosphate,
S,S-diethyl-S-1,2,2-trichloroethyl trithiophosphate,
S,S-di-(2-chloroethyl)-S-1,2,2-trichloroethyl
   trithiophosphate,
S,S-dibutyl-S-1,2,2-trichloroethyl trithiophosphate,
S,S-diphenyl-S-1,2,2-trichloroethyl trithiophosphate,
S,S-di-p-chlorophenyl-S-1,2,2-trichloroethyl
   trithiophosphate,
S,S-di-p-tolyl-S-1,2,2-trichloroethyl trithiophosphate,
S,S-dimethyl-S-2,2,2-trichloroethyl trithiophosphate,
S,S-diethyl-S-2,2,2-trichloroethyl trithiophosphate, S-S-ethylene-(1,2)-S-2,2,2 - trichloroethyl trithiophosphate (made from one mole of S-2,2,2-trichloroethyl sulfenyl phosphoryl dichloride and one mole of 1,2-ethanedithiol),
S,S-diisopropyl-S-2,2,2-trichloroethyl trithiophosphate,
S,S-diphenyl-S-2,2,2-trichloroethyl trithiophosphate,
S,S-di-p-chlorophenyl-S-2,2,2-trichloroethyl trithiophosphate,
S-S-di-p-tolyl-S-2,2,2-trichloroethyl trithiophosphate,
S,S-dimethyl-S-2,2-dichlorovinyl trithiophosphate,
S,S-diethyl-S-2,2-dichlorovinyl trithiophosphate,
S,S-di-(2,2-dichloroethyl)-S-2,2-dichlorovinyl trithiophosphate,
S,S-diisopropyl-S-2,2-dichlorovinyl trithiophosphate,
S,S-dibutyl-S-2,2-dichlorovinyl trithiophosphate,
S,S-di-t-butyl-S-2,2-dichlorovinyl trithiophosphate,
S,S-di-p-chlorophenyl-S-2,2-dichlorovinyl trithiophosphate,
S,S-di-p-tolyl-S-2,2-dichlorovinyl trithiophosphate,
S,S-trimethylene-(1,3)-S-1,2,2-trichloroethyl trithiophosphate,
S,S-ethylene-(1,2)-S-2,2-dichlorovinyl trithiophosphate,
S,S-dibutyl-S-1,2-dichlorovinyl trithiophosphate,
S,S-di (m-nitrophenyl)-S-1,2,2-trichloroethyl trithiophosphate,
S,S-di (p-nitrophenyl)-S-2,2-dichlorovinyl trithiophosphate,
S,S-bis (2,2-dichloroethyl)-S-2,2-dichlorovinyl trithiophosphate,
S,S-bis (3,3-dichloropropyl)-S-1,2,2-trichloroethyl trithiophosphate,
S,S-di-(2-propylthioethyl)-S-2,2-dichlorovinyl trithiophosphate,
S,S-di-(3-ethylthiopropyl)-S-2,2,2-trichloroethyl trithiophosphate,
S,S-di (p-methoxyphenyl)-S-1,2,2-trichloroethyl trithiophosphate,
S,S-di-(o-ethoxyphenyl)-S-2,2-dichlorovinyl trithiophosphate.

The reaction of the mercaptan or thiophenol with the sulfenyl phosphoryl dichloride is preferably carried out in the presence of sufficient base to neutralize the HCl formed in the reaction. Preferably, the base is added gradually to the mixture of mercaptan and sulfenyl phosphoryl dichloride. The preferred bases are tertiary amines such as trimethyl amine, triethyl amine, tripropyl amine, tributyl amine, triisobutyl amine, trihexyl amine, pyridine, N-methyl piperidine, tribenzyl amine, N,N-dimethyl aniline, dibutyl ethyl amine, trioctadecyl amine, triallyl amine, trioctyl amine, tricyclohexyl amine, although there can also be used bases such as sodium hydroxide, potassium hydroxide, sodium carbonate, barium hydroxide and anion exchange resins.

Unless otherwise indicated, all parts and percentages are by weight.

Example 1

26 grams (0.177 mole) of EtOPCl$_2$ (ethyl phosphorous dichloride), were diluted with 150 ml. of dry carbon tetrachloride and 35 grams (0.177 mole) of 1,2,2-trichloroethyl sulfenyl chloride were added dropwise with stirring at 30-32° C. (occasional cooling) over a period of 30 minutes. The reaction was rapid as demonstrated by the almost immediate decoloration of the sulfenyl chloride. Standing of the reaction mixture overnight at room temperature, removing all volatiles under reduced pressure and high vacuum distillation gave 39 grams (78% yield) of 1,2,2-trichloroethyl sulfenyl phosphoryl dichloride (CP 50) as a colorless liquid.

Example 2

13.0 grams (0.046 mole) of CP 50 were dissolved in 150 ml. of Skellysolve B (aliphatic petroleum hydrocarbon solvent boiling in the hexane range) and 4.5 grams (0.092 mole plus a slight excess) of methyl mercaptan were introduced at 0–10° C. (ice-water bath). 9.2 grams of triethylamine (0.092 mole) was then added with stirring and cooling at 25–30° C. Further stirring, washing in succession with water, dilute HCl, dilute NaHCO$_3$ and water, drying over anhydrous MgSO$_4$ and high vacuum evaporation gave 8.5 grams (60% yield) of S,S-dimethyl-S-1,2,2-trichloroethyl phosphate (also called S,S-dimethyl-S-1,2,2-trichloroethyl trithiophosphate),

as a brown oil, $n_D^{25}$ 1.6178, S 31.0%, P 10.0%. It was purified by distillation at 129–130° C. at 0.02 mm. Hg and had an $n_D^{25}$ 1.6205. The product was useful as a fungicide, nematocide, defoliant, desiccant, as a post emergent herbicide and as an insecticide against the flour beetle and housefly.

Example 3

To 15 grams (0.053 mole) of CP 50 in 150 ml. of dry petroleum ether 6.6 grams (0.106 mole) of ethyl mercaptan were added at 10° C. followed by dropwise addition of 10.6 grams (0.106 mole) of triethyl amine with stirring and cooling at 10–15° C. Standing overnight at room temperature, washing in succession with sodium bicarbonate and water, drying over anhydrous MgSO$_4$ and stripping gave 11.8 grams (67% yield) of S,S-diethyl-S-1,2,2-trichloroethyl phosphate as a light brown oil, $n_D^{25}$ 1.5770. This product had the same uses as the product of Example 2.

Example 4

To 8.46 grams (0.03 mole) of CP 50 in 150 ml. of petroleum ether were added 7.86 grams (0.06 mole) of 2,2-dichloroethyl mercaptan at 15° C. Then 6.06 grams (0.06 mole) of triethyl amine in 10 ml. of petroleum ether were added dropwise with stirring and cooling at or below 25° C. The conversion was fast and complete after one further hour's standing at room temperature. Washing of the resulting mixture in succession with water, dilute HCl, dilute NaHCO$_3$ and water, drying of the organic layer over anhydrous MgSO$_4$ and high vacuum stripping gave 10 grams (70% yield) of S,S-di(2,2-dichloroethyl)-S-1,2,2-trichloroethyl phosphate. This product had the same uses as the product of Example 2.

Example 5

11.25 grams (0.04 mole) of CP 50 were dissolved in 150 ml. of dry petroleum ether and 7.2 grams (0.08 mole) of n-butyl mercaptan were added dropwise with stirring at 5–10° C.; 8.2 grams (0.08 mole) of triethyl amine in 20 ml. of petroleum ether were then added dropwise with stirring and cooling (ice-water bath) at below 25° C. Stirring one additional hour at room temperature and standing overnight gave after washing with water, dilute HCl and dilute NaHCO$_3$, drying with MgSO$_4$ and high vacuum stripping 12.5 grams (81% yield) of S,S-di-n-butyl-S-1,2,2-trichloroethyl phosphate as a light orange oil which was found to contain 10–15% of dibutyl disulfide as an impurity. Distillation gave the pure product as a yellow oil, B.P.$_{0.06}$ 160–165° C., $n_D^{25}$ 1.5572. The distilled yield was 70% of the crude or 57% overall.

The product of Example 5 was useful as a fungicide, defoliant, desiccant, post emergent herbicide and insecticide (against the flour beetle and housefly).

Example 6

11.6 grams (0.105 mole) of thiophenol were added to a solution of 15 grams (0.053 mole) of CP 50 in 150 ml. of dry petroleum ether followed by dropwise addition with stirring and cooling of 10.7 grams (0.106 mole) of triethyl amine in 10 ml. of petroleum ether at 0–5° C. over a period of 30 minutes. Three hours stirring at room temperature, washing with dilute sodium bicarbonate, drying with magnesium sulfate and stripping gave 19.1 grams (84% yield) of S,S-diphenyl-S-1,2,2-trichloroethyl phosphate as a bright yellow oil, $n_D^{25}$ 1.6516. The product of Example 6 was useful as a fungicide, defoliant and desiccant.

Example 7

To 11.28 grams (0.04 mole) of CP 50 dissolved in 200 ml. of petroleum ether there were added 11.5 grams (0.079 mole) of p-chlorothiophenol in 50 ml. of benzene followed by dropwise addition of 8.2 grams (0.08 mole) of triethylamine with stirring at below 25° C. over a period of 30 minutes. Heating to 45–50° C. for a further 30 minutes and washing the mixture with water dilute HCl, dilute NaHCO$_3$ and again with water followed by drying over MgSO$_4$ and vacuum stripping gave 16.0 grams (81% yield) of S,S-di-p-chlorophenyl-S-1,2,2-trichloroethyl phosphate as a heavy brown oil, $n_D^{25}$ 1.6554. The product of Example 7 was useful as a fungicide and post emergent herbicide.

Example 8

9.92 grams (0.08 mole) of p-toluene thiol in 50 ml. of benzene were added to a solution of 11.28 grams (0.04 mole) of CP 50 in 200 ml. of petroleum ether with stirring followed by dropwise addition of 8.2 grams (0.08 mole) of triethyl amine in 20 ml. of petroleum ether with stirring and cooling at below 25° C. Warming for 1 hour to 45–50° C. and standing overnight gave after washing with dilute HCl, dilute NaHCO$_3$ and water, drying over MgSO$_4$ and stripping 15.7 grams (86% yield) of S,S-di-p-tolyl-S-1,2,2-trichloroethyl phosphate as a light brown heavy oil $n_D^{25}$ 1.6440. The product of Example 8 was useful as a fungicide and insecticide (against the flour beetle and housefly).

Example 9

16 grams (0.109 mole) of EtOPCl$_2$ were diluted with 100 ml. of dry carbon tetrachloride and 17 grams (0.085 mole) of 2,2,2-trichloroethyl sulfenyl chloride were added dropwise with stirring and occasional cooling at 25–30° C. over a period of 30 minutes. Stirring the mixture at room temperature for three further hours and fractionating, finally in high vacuum gave 23 grams (95% yield) of 2,2,2-trichloroethyl sulfenyl phosphoryl dichloride (CP 51) as a colorless liquid.

Example 10

2.88 grams (0.06 mole) of methyl mercaptan were introduced into a solution of 8.46 grams (0.03 mole) of CP 51 followed by dropwise addition of 6.06 grams (0.06 mole) of triethyl amine at 25–30° C. with stirring and cooling over a period of 30 minutes. In order to offset any losses of methyl mercaptan, 0.6 gram more of methyl mercaptan was introduced and the mixture was allowed to stand for a further two hours at room temperature. Washing with water, dilute HCl, dilute NaHCO$_3$ and water, drying over MgSO$_4$ and high vacuum stripping gave 8.7 grams (95% yield) of S,S-dimethyl-S-2,2,2-trichloroethyl phosphate as a light orange oil, $n_D^{25}$ 1.6038. The product of Example 10 was useful as a fungicide, nematocide, post emergent herbicide, defoliant, desiccant and insecticide.

Example 11

To 7.0 grams (0.024 mole) of CP 51 in 150 ml. of Skellysolve B there were added 3.1 grams (0.05 mole) of ethyl mercaptan with cooling followed by dropwise addition of 5.0 grams (approximately 0.05 mole) of triethyl amine in 10 ml. of Skellysolve B at 10–15° C. One hour's stirring at room temperature, washing with water, dilute HCl, dilute NaHCO$_3$ and water, drying over MgSO$_4$ and high vacuum stripping gave S,S-diethyl-S-2,2,2-trichloroethyl phosphate as a colorless oil, $n_D^{25}$ 1.5736. The product was useful in the same manner as the product of Example 10.

Example 12

3.8 grams (0.04 mole) of 1,2-ethylene dithiol were added to a solution of 11.3 grams (0.04 mole) of CP 51 in 200 ml. of petroleum ether followed by dropwise addition of 8.2 grams (0.08 mole) of triethyl amine in 20 ml. of petroleum ether with stirring and cooling at 10° C., stirring for 30 minutes at 40–45° C. and for 1 hour at room temperature gave after washing with water, dilute HCl, dilute NaHCO$_3$, drying over MgSO$_4$ and vacuum stripping 7.5 grams (61% yield) of S,S-ethylene (1,2)-S-2,2,2-trichloroethyl phosphat of the formula

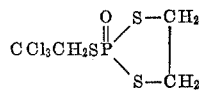

as a heavy colorless oil. It was useful as a fungicide, nematocide, post emergent herbicide, desiccant and insecticide against houseflies.

Example 13

8.05 grams (0.106 mole) of isopropyl mercaptan were added to 15 grams (0.053 mole) of CP 51 in 150 ml. of dry petroleum ether. 10.6 grams (0.106 mole) of triethyl amine were then added dropwise with stirring and cooling at 0–5° C. over a period of 0.5 hour. Stirring for 3 hours at room temperature and working up as before (washing, drying and stripping) gave 15.1 grams (78% yield) of S,S-diisopropyl-S-2,2,2-trichloroethyl phosphate as an almost colorless heavy oil, $n_D^{25}$ 1.5627. The product of Example 13 was useful as a fungicide, nematocide, defoliant and desiccant.

Example 14

8.8 grams (0.08 mole) of thiophenol were added to 11.3 grams (0.04 mole) of CP 51 in 150 ml. of dry petroleum ether followed by addition of 8.2 grams (0.08 mole) of triethyl amine with stirring and cooling at approximately 25° C. After warming for one additional hour at 40–45° C. the mixture was washed with water, dilute HCl, dilute NaHCO$_3$ and water, dried over MgSO$_4$ and vacuum stripped. There were obtained 13.5 grams (78% yield) of S,S-diphenyl-S-2,2,2-trichloroethyl phosphate as a light yellow oil containing some diphenyl disulfide as an impurity, $n_D^{28}$ 1.6555. Stripping in high vacuum grave the purified product having an $n_D^{25}$ 1.6495. The product was useful as a fungicide, nematocide, post emergent herbicide, desiccant and insecticide against houseflies.

Example 15

11.5 grams (0.08 mole) of p-chlorothiophenol were were to 11.3 grams (0.04 mole) of CP 51 dissolved in 200 ml. of petroleum ether and reacted with 8.2 grams (0.08 mole) of triethyl amine as before to give after washing, drying and stripping 16.5 grams (83% yield) of S,S-di-p-chlorophenyl-S-2,2,2-trichloroethyl phosphate as a heavy yellow oil, $n_D^{25}$ 1.6680. The product was useful as a fungicide, nematocide, post emergent herbicide, desiccant and insecticide against flour beetles.

Example 16

To 15.0 grams (0.053 mole) of CP 51 in 150 ml. of dry petroleum ether were added 13.1 grams (0.106 mole) of p-thiocresol followed by 10.6 grams (0.106 mole) of triethyl amine which was added dropwise with stirring and cooling at 0–5° C. over a period of 1 hour. Continued stirring at room temperature for 3 hours, washing, drying and stripping of the organic mixture as described above gave 23 grams (95% yield) of S,S-di-p-tolyl-S-2,2,2-trichloroethyl phosphate as a light yellow oil, $n_D^{25}$ 1.6382. The product was useful as a fungicide, nematocide, preemergent herbicide, post emergent herbicide, defoliant, desiccant and insecticide against flour beetles.

Example 17

12.0 grams (0.073 mole) of 2,2-dichlorovinyl sulfenyl chloride were added dropwise with stirring at 15–20° C. to a solution of 11 grams (0.08 mole) of EtOPOCl in 50 cc. of dry carbon tetrachloride. The red sulfenyl chloride color disappeared instantly and a light yellow solution was formed. When the solution was allowed to attain room temperature (25–30° C.) the yellow color soon disappeared forming a completely colorless solution. After removing the solvent, distillation in vacuum gave 12.0 grams (67% yield) of 2,2-dichlorovinyl sulfenyl phosphoryl dichloride (CP 52) as a colorless liquid.

Example 18

5 grams (over 0.10 mole) of methyl mercaptan were absorbed in a solution of 9.84 grams (0.04 mole) of CP 52 in 150 ml. of petroleum ether at 5–10° C. 8.08 grams (0.08 mole) of triethyl amine were then added dropwise with stirring and cooling at 0–5° C. After stirring at room temperature for 3 hours the mixture was washed with water and dilute NaHCO$_3$, dried over anhydrous MgSO$_4$ and stripped in a high vacuum. 7.5 grams (70% yield) of crude S,S-dimethyl-S-2,2-dichlorovinyl phosphate were obtained as an almost colorless, mobile liquid, $n_D^{25}$ 1.6243, most of which distilled at B.P.$_{0.04}$ 120–123° C. to give the pure product $n_D^{26}$ 1.6303. The product was useful as a fungicide, nematocide, post emergent herbicide, desiccant and insecticide (against flour bettles and houseflies).

Example 19

6.6 grams (0.106 mole plus a slight excess) of ethyl mercaptan were added to 13 grams (0.053 mole) of CP 52 in 150 ml. of dry petroleum ether followed by dropwise addition of 10.6 grams (0.106 mole) of triethyl amine in 10 ml. of petroleum ether with stirring and cooling at 0–5° C. After stirring for 3 hours at room temperature, washing with water and dilute NaHCO$_3$, drying over MgSO$_4$ and stripping there were obtained 13.3 grams (85% yield) of crude S,S-diethyl-S-2,2-dichlorovinyl phosphate as an almost colorless oil, $n_D^{28}$ 1.5900 which was purified by distillation to give the final product having a B.P.$_{0.08}$ 105–109° C., $n_D^{25}$ 1.6131. The product was useful as a fungicide, nematocide, post emergent herbicide, defoliant, desiccant and insecticide (against flour beetle and houseflies).

Example 20

8.2 grams (0.033 mole) of CP 52 were dissolved in 150 ml. of dry petroleum ether and 8.8 grams (0.066 mole) of 2,2-dichloroethyl mercaptan were added at room temperature. With stirring and cooling 6.6 grams (0.066 mole) of triethylamine in 10 ml. of dry petroleum ether were added dropwise at 5–10° C. over a period of 30 minutes. Heating for 15 minutes to 45° C., (gentle reflux) and standing for 3 hours at room temperature were employed followed by washing with dilute HCl, dilute NaHCO$_3$ and water, drying over MgSO$_4$ and stripping in a vacuum. There were obtained 12.2 grams (85% yield) of crude S,S-di(2,2-dichloroethyl)-S-2,2-dichlorovinyl phosphate as a slightly yellow oil $n_D^{27}$ 1.6148. This was distilled to give the pure product B.P.$_{0.1}$ 180° C., $n_D^{25}$ 1.6165. The product was useful as a fungicide, nematocide, post emergent herbicide, defoilant, desiccant and insecticide (against flour beetle).

Example 21

10.9 grams (0.08 mole) of propylthioethyl mercaptan were added to a solution of 9.83 grams (0.04 mole) of CP 52 in 150 ml. of dry petroleum ether and reacted by dropwise addition of 8.08 grams (0.08 mole) of triethyl amine in 10 ml. of petroleum ether with stirring and cooling at 25–30° C. to give after working up by washing, drying and stripping 16.8 grams (95% yield) of S,S-di-2-propylthioethyl-S-2,2-dichlorovinyl phosphate as a light yellow oil, $n_D^{25}$ 1.5945. The product was useful as a fungicide, nematocide, preemergent herbicide, post emergent herbicide, defoliant, desiccant and insecticide (against flour beetle).

Example 22

8.05 gram (0.106 mole) of isopropyl mercaptan were added to 13 grams (0.053 mole) of CP 52 in 150 ml. of dry petroleum ether at room temperature. 10.7 grams (0.106 mole) of triethyl amine in 10 ml. of petroleum ether were then added dropwise with stirring at 0–5° C. with external cooling and the resulting mixture was then stirred at room temperature for 3 hours. It was washed with dilute HCl, dilute NaHCO$_3$ and water and dried over MgSO$_4$ and stripped to give 14.2 grams (85% yield) of S,S-di-isopropyl-S-2,2-dichlorovinyl phosphate as an almost colorless oil, $n_D^{25}$ 1.5602. The product was useful as a fungicide, nematocide, preemergent heribicide, post emergent herbicide, and desiccant.

Example 23

6.5 grams (0.07 mole plus a small excess) of n-butyl mercaptan were mixed with 8.6 grams (0.035 mole) of CP 52 in 150 ml. of petroleum ether and 7.1 grams (0.07 mole) of triethyl amine in 10 ml. of petroleum ether were added dropwise with stirring and cooling at 5–10° C. Washing the obtained mixture with water, dilute HCl, dilute NaHCO$_3$, drying over anhydrous MgSO$_4$ and high vacuum stripping gave 10.0 grams (81% yield) of S,S-di-n-butyl-S-2,2-dichlorovinyl phosphate as an almost colorless oil, $n_D^{25}$ 1.5540 containing 5–10% of dibutyl disulfide as an impurity. The product was useful as a fungicide, post emergent herbicide, desiccant and insecticide (against flour beetles and houseflies).

Example 24

9.55 grams (0.106 mole) of t-butyl mercaptan were mixed with 13 grams (0.053 mole) of CP 52 in 150 ml. of dry petroleum ether and 10.6 grams (0.106 mole) of triethyl amine in 10 ml. of petroleum ether were added dropwise with stirring and cooling at 0–5° C. over a period of 30 minutes followed by stirring at room temperature for approximately 3 hours. Washing with dilute HCl, dilute NaHCO$_3$ and water, drying over MgSO$_4$ and vacuum stripping gave 15.5 grams (85% yield) of S,S-di-t-butyl-S-2,2-dichlorovinyl phosphate as an almost colorless oil, $n_D^{25}$ 1.5683. The product was useful as a fungicide, defoliant and desiccant.

Example 25

8.67 grams (0.06 mole) of p-chlorothiophenol were mixed with 7.38 grams (0.035 mole) of CP 52 in 150 ml. of dry benzene and 6.06 grams (0.06 mole) of triethyl amine in 10 ml. of benzene were added dropwise with stirring and moderate cooling at 25–30° C. The resulting mixture was allowed to stand overnight at room temperature and was washed with dilute HCl, dilute NaHCO$_3$ and water, dried over MgSO$_4$ and high vacuum stripped to obtain 11.5 grams (83% yield) of S,S-di-p-chlorophenyl-S-2,2-dichlorovinyl phosphate as a light yellow heavy oil, $n_D^{26}$ 1.6692. The product was useful as a fungicide, nematocide, preemergent herbicide, post emergent herbicide, desiccant and insecticide (against flour beetles and houseflies).

Example 26

7.44 grams (0.06 mole) of p-thiocresol were mixed with 7.38 grams (0.03 mole) of CP 52 in 150 ml. of dry benzene and 6.06 grams (0.06 mole) of triethyl amine in 10 ml. of benzene added dropwise with stirring at 25–30° C. Standing at room temperature overnight, washing, drying and stripping as set forth supra furnished 11.5 grams (91% yield) of S,S-di-p-tolyl-S-dichlorovinyl phosphate as an almost colorless oil, $n_D^{25}$ 1.6600.

Example 27

The procedure of Example 13 was repeated replacing the isopropyl mercaptan by n-butyl mercaptan to produce S,S-dibutyl-S-2,2,2-trichloroethyl phosphate.

The pesticides, defoliants and desiccants of the present invention can be used alone or they can be applied together with inert solids to form dusts, or can be suspended in a suitbale liquid dilute, e.g. organic solvents or water.

There can also be added surface active agents or wetting agents and/or inert solids in the liquid formulations. In such case, the active ingredient can be from 0.01 to 95% by weight of the entire composition.

As organic solvents there can be employed hydrocarbons, e.g. benzene, toluene, xylene, kerosene, diesel fuel, fuel oil, and petroleum naphtha, ketones such as acetone, methyl ethyl ketone and cyclohexanone, chlorinated hydrocarbons such as carbon tetrachloride, chloroform, trichloroethylene, and perchloroethylene, esters such as ethyl acetate, amyl acetate and butyl acetate, ethers, e.g. ethylene glycol monomethyl ether and diethylene glycol monomethyl ether, alcohols, e.g. methanol, ethanol, isopropanol, amyl alcohol, ethylene glycol, propylene gycol, butyl carbitol acetate and glycerine. Mixtures of water and organic solvents, either as solutions or emulsions, can be employed. Since the phosphoryl dichlorides are hydrolyzed in water it is not one of the preferred diluents.

The novel pesticides can also be applied as aerosols, e.g. by dispersing them in air by means of a compressed gas such as dichlorodifluoromethane or trichlorofluoromethane and other Freons and Genetrons, for example.

The pesticides of the present invention can also be applied with adjuvants or carriers such as talc, pyrophyllite, synthetic fine silica, attapulgus clay, kieselguhr, chalk, diatomaceous earth, lime, calcium carbonate, bentonite, fuller's earth, cotton-seed hulls, wheat flour, soybean flour, pumice, tripoli, wood flour, walnut shell flour, redwood flour and lignin.

As stated, it is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g. p-isooctylphenol condensed with 10 ethylene oxide units, soaps, e.g. sodium stearate and potassium oleate, sodium salt of propyl-naphthalene sulfonic acid, di (2-ethylhexyl) ester of sodium sulfosuccinic acid, sodium lauryl sulfate, sodium decane sulfonate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene glycol esters of fatty acids and rosin acids, e.g. Ethofat 7 and 13, sodium N-methyl-N-oleyl taurate, Turkey Red Oil, sodium dibutyl naphthalene sulfonate, sodium lignin sulfonate, polyethylene glycol stearate, sodium dodecylbenzene sulfonate, tertiary dodecyl polyethylene glycol thioether (Nonionic 218), long chain ethylene oxide-propylene oxide condensation products, e.g. Pluronic 61 (molecular weight 1000), polyehtylene glycol ester of tall oil acids, sodium octyl phenoxyethoxyethyl sulfate, tris (polyoxyethylene) sorbitan monostearate (Tween 60), and sodium dihexyl sulfosuccinate.

The solid and liquid formulations can be prepared by any of the conventional procedures. The compounds of the present invention can be applied to soil, growing plants, e.g. trees, cotton plants, wheat and other grain plants, vegetable plants, seeds, fabrics, etc. to give pesticidal protection.

Example 28

The compounds of the present invention were tested as fungicides in agar plate tests using potato dextrose agar as the culture medium. In Table 1 Col stands for *Colletotrichum obiculare*, Fus for *Fusarium lycopersici*, Hel for *Helminthosporium sativum*, Rhiz for *Rhizoctonia solani*, Vert for *Verticilliuf spp.*, C.U. for *Ceratocystis ulmi*. An asterisk in the Col column indicates that *Cera. obiculare* was the fungas used and an asterisk in the Fus column indicates that *Fusarium nivale* was the fungus employed. The inhibition of growth of the fungi is recorded on a 0–10 scale with 0 indicating no inhibition and 10 indicating complete inhibition. In the table, Rate A is 500 p.p.m., Rate B is 100 p.p.m. and Rate C is 10 p.p.m.

TABLE 1

| Compound of example | Col | | | Fus | | | Hel | | | Rhiz | | | Vert | | | C.U. | | |
|---|---|---|---|---|---|---|---|---|---|---|---|---|---|---|---|---|---|---|
| | A | B | C | A | B | C | A | B | C | A | B | C | A | B | C | A | B | C |
| 2 | 10 | 5 | 0* | 10 | 10 | 0 | 10 | 2 | 2 | 10 | 10 | 2 | 10 | 10 | 0 | 10 | 0 | 0 |
| 3 | 10 | 0 | 0 | 10 | 0 | 0 | 5 | 2 | 2 | 10 | 0 | 0 | 10 | 0 | 0 | 5 | 0 | 0 |
| 4 | 10 | 2 | 0 | 10 | 5 | 2 | 5 | 2 | 2 | 10 | 0 | 0 | 10 | 10 | 0 | 8 | 2 | 0 |
| 5 | 0 | 0 | 0 | 0 | 0 | 0 | 0 | 0 | 0 | 5 | 0 | 0 | 2 | 0 | 0 | 0 | 0 | 0 |
| 6 | 10 | 0 | 0 | 10 | 2 | 2 | 5 | 5 | 5 | 8 | 0 | 0 | 10 | 0 | 0 | 5 | 0 | 0 |
| 7 | 0 | 0 | 0 | 2 | 0 | 0 | 0 | 0 | 0 | 5 | 0 | 0 | 0 | 0 | 0 | 2 | 0 | 0 |
| 8 | 0 | 0 | 0 | 2 | 0 | 0 | 0 | 0 | 0 | 0 | 0 | 0 | 0 | 0 | 0 | 2 | 0 | 0 |
| 10 | 10 | 8 | 0 | 10 | 5 | 0 | 8 | 2 | 0 | 10 | 10 | 0 | 10 | 0 | 0 | 5 | 0 | 0 |
| 11 | 10 | 10 | 0 | 5 | 0 | 0 | 5 | 5 | 0 | 10 | 8 | 5 | 0 | 0 | 0 | 5 | 5 | 0 |
| 12 | 5 | 0 | 0* | 5 | 0 | 0 | 0 | 0 | 0 | 5 | 0 | 0 | 5 | 2 | 0 | 5 | 0 | 0 |
| 13 | 0 | 0 | 0 | 0 | 0 | 0 | 2 | 2 | 2 | 5 | 5 | 5 | 0 | 0 | 0 | 0 | 0 | 0 |
| 14 | 5 | 0 | 0* | 5 | 0 | 0 | 0 | 0 | 0 | 0 | 0 | 0 | 2 | 2 | 0 | 2 | 0 | 0 |
| 15 | 5 | 0 | 0* | 5 | 0 | 0 | 0 | 0 | 0 | 0 | 0 | 0 | 0 | 0 | 0 | 5 | 2 | 0 |
| 16 | 0 | 0 | 0* | 5 | 2 | 0* | 0 | 0 | 0 | 0 | 0 | 0 | 0 | 0 | 0 | 0 | 0 | 0 |
| 18 | 10 | 0 | 0 | 10 | 5 | 0 | 5 | 2 | 0 | 10 | 5 | 0 | 10 | 0 | 0 | 5 | 0 | 0 |
| 19 | 10 | 5 | 0 | 10 | 5 | 2* | 8 | 5 | 2 | 10 | 0 | 0 | 10 | 0 | 0 | 5 | 0 | 0 |
| 20 | 10 | 2 | 0 | 10 | 10 | 0 | 5 | 2 | 2 | 8 | 0 | 0 | 10 | 8 | 0 | 8 | 0 | 0 |
| 21 | 0 | 0 | 0* | 2 | 0 | 0 | 0 | 0 | 0 | 5 | 2 | 0 | 0 | 0 | 0 | 2 | 0 | 0 |
| 22 | 8 | 0 | 0* | 10 | 10 | 5* | 5 | 2 | 0 | 8 | 2 | 0 | 0 | 0 | 0 | 2 | 0 | 0 |
| 24 | 0 | 0 | 0* | 0 | 0 | 0 | 0 | 0 | 0 | 2 | 0 | 0 | 0 | 0 | 0 | 0 | 0 | 0 |
| 25 | 0 | 0 | 0* | 5 | 0 | 0 | 0 | 0 | 0 | 5 | 0 | 0 | 0 | 0 | 0 | 2 | 0 | 0 |
| 26 | 0 | 0 | 0* | 2 | 0 | 0 | 0 | 0 | 0 | 0 | 0 | 0 | 0 | 0 | 0 | 0 | 0 | 0 |

The compounds were also tested in spore germination tests against Alternaria spp. and while they showed some activity they were not as effective as in the agar plate tests.

Example 29

The compounds were also tested as soil fungicides. 2 grams of the compound were mixed with an equal weight of attapulgus clay. The mixture was then blended with soid infested with Pythium. 100 mg. of the 50% formulation in 500 grams of soil is equal to 200 lbs./acre. After blending with the soil, the mixture was allowed to stand for 24 hours. Then the blend was spread evenly over a wet paper towel and 50 pea seeds were placed on the soil. The towels were rolled up and put in metal cans and stored at 40° F. for 5 days and then at 75° F. for 4 days. The cans were then removed and the rate of fungus growth recorded, with 10 indicating no growth (perfect control) and 0 indicating complete growth (no control). The results are set forth in Table 3.

TABLE 2

| Compound of example | 200 lbs./acre | 50 lbs./acre |
|---|---|---|
| 2 | 7 | 6 |
| 3 | 10 | 4 |
| 4 | 5 | 0 |
| 5 | 5 | 0 |
| 6 | 0 | 0 |
| 7 | 4 | 4 |
| 8 | 5 | 2 |
| 10 | 4 | 4 |
| 11 | 9 | 6 |
| 12 | 3 | 0 |
| 13 | 6 | 1 |
| 14 | 2 | 3 |
| 15 | 0 | 0 |
| 16 | | |
| 18 | | |
| 19 | 7 | 5 |
| 20 | 7 | 3 |
| 21 | | |
| 22 | 3 | 0 |
| 23 | 0 | 0 |
| 24 | 0 | 0 |
| 25 | 4 | 3 |
| 26 | 2 | 3 |
| 27 | 0 | 0 |

Example 30

The compounds were tested as nematocides using water as the medium with Panagrellus and Rhabditis spp. at room temperature. The results as shown in Table 3 were recorded as percent kill after a 4 days' incubation period. The blank mortality rate was 10%.

TABLE 3

| Compound | 400 p.p.m. | 200 p.p.m. | 25 p.p.m. |
|---|---|---|---|
| 2 | 100 | 100 | 20 |
| 3 | 100 | 100 | 50 |
| 4 | 100 | 100 | 20 |
| 5 | 10 | 10 | 10 |
| 6 | 10 | 10 | 10 |
| 7 | 10 | 10 | 10 |
| 8 | 10 | 10 | 10 |
| 10 | 100 | 100 | 100 |
| 11 | 100 | 100 | 100 |
| 12 | 100 | 100 | 10 |
| 13 | 100 | 100 | 10 |
| 14 | 75 | 20 | 10 |
| 15 | 75 | 20 | 10 |
| 16 | 100 | 100 | 10 |
| 18 | 100 | 100 | 10 |
| 19 | 100 | 100 | 10 |
| 20 | 100 | 25 | 10 |
| 21 | 100 | 100 | 10 |
| 22 | 75 | 50 | 50 |
| 23 | 10 | 10 | 10 |
| 24 | 100 | 50 | 20 |
| 25 | 100 | 75 | 10 |
| 26 | 100 | 75 | 10 |
| 27 | 100 | 100 | 10 |

Example 31

The compounds of the present invention do not have any significant preemergent activity although the compound of Example 5 showed 30% effectiveness against oats, radish and wheat at 20 lbs./acre and the compound of Example 25 showed 90% effectiveness against Japanese Millet at 10 lbs./acre.

Some of the compounds showed fair post emergent herbicide activities as shown in Table 5 at the indicated rates in lbs./acre. The ratings are on a 0–10 scale with 0 indicating no herbicidal activity and 10 indicating 100% kill of the plants.

TABLE 4

| Compound of example | Oats 8 lb. | Oats 2 lb. | Sugarbeets 8 lb. | Sugarbeets 2 lb. | Radish 8 lb. | Radish 2 lb. | Flax 8 lb. | Flax 2 lb. | Wheat 8 lb. | Wheat 2 lb. |
|---|---|---|---|---|---|---|---|---|---|---|
| 2 | 2 | 0 | 7 | 3 | 6 | 3 | 5 | 2 | 3 | 0 |
| 3 | | | | | | | | | | |
| 4 | 5 | 3 | 3 | 1 | 5 | 2 | 5 | 2 | 5 | 2 |
| 5 | 4 | 1 | 6 | 5 | 6 | 5 | 5 | 3 | 2 | 0 |
| 6 | | | | | | | | | | |
| 7 | 2 | 0 | 6 | 6 | 6 | 5 | 3 | 3 | 0 | 0 |
| 8 | | | | | | | | | | |
| 10 | 4 | 2 | 0 | 0 | 3 | 2 | 3 | 2 | 4 | 2 |
| 11 | 5 | 3 | 0 | 1 | 3 | 3 | 4 | 1 | 4 | 3 |
| 12 | 5 | 0 | 6 | 3 | 7 | 5 | 6 | 3 | 3 | 0 |
| 13 | | | | | | | | | | |
| 14 | 1 | 0 | 6 | 5 | 3 | 3 | 3 | 1 | 0 | 0 |
| 15 | 0 | 0 | 6 | 3 | 4 | 3 | 3 | 2 | 0 | 0 |
| 16 | 6 | 3 | 3 | 0 | 3 | 1 | 4 | 1 | 4 | 2 |
| 18 | 8 | 3 | 1 | 0 | 2 | 3 | 3 | 3 | 3 | 2 |
| 19 | 8 | 5 | 3 | 2 | 6 | 4 | 6 | 4 | 5 | 6 |
| 20 | 5 | 3 | 2 | 1 | 2 | 3 | 3 | 3 | 3 | 4 |
| 21 | 3 | 2 | 3 | 1 | 2 | 1 | 2 | 1 | 3 | 2 |
| 22 | 0 | 0 | 6 | 2 | 6 | 2 | 4 | 1 | 0 | 0 |
| 23 | 3 | 0 | 6 | 5 | 6 | 5 | 2 | 2 | 0 | 0 |
| 24 | | | | | | | | | | |
| 25 | 4 | 4 | 7 | 6 | 6 | 6 | 6 | 6 | 1 | 0 |
| 26 | 3 | 2 | 6 | 4 | 6 | 3 | 4 | 2 | 0 | 0 |
| 27 | 5 | 0 | 6 | 3 | 7 | 5 | 6 | 3 | 3 | 0 |

Example 32

Some of the compounds of the present invention showed excellent defoliant and desiccation activity and in fact were equal to DEF (S,S,S-tributyl trithiophosphate) a commercial cotton defoliant. The compounds were applied as a 2% solution in acetone at the indicated rates per acre to cotton plants. The defoliation is expressed in Table 5 in percent with IN indicating that the compound was inactive. Desiccation is indicated in Table 6 on a 0–10 scale with 0 indicating no desiccation and 10 indicating 100% desiccation.

TABLE 5

| Compound of example | Defoliation | | Desiccation | |
|---|---|---|---|---|
| | 8 lbs. | 2 lbs. | 8 lbs. | 2 lbs. |
| 2 | 25 | 10 | 8 | 2 |
| 3 | 41 | 35 | 7 | 5 |
| 4 | 71 | 6 | 8 | 3 |
| 5 | 87 | 74 | 9 | 7 |
| 6 | 38 | 17 | 4 | 1 |
| 7 | IN | | 1 | 1 |
| 8 | IN | | 0 | 0 |
| 10 | 28 | 25 | 8 | 4 |
| 11 | 17 | 11 | 4 | 4 |
| 12 | IN | | 2 | 1 |
| 13 | 78 | 56 | 7 | 5 |
| 14 | IN | | 2 | 1 |
| 15 | IN | | 2 | 1 |
| 16 | 13 | 0 | 3 | 1 |
| 18 | 57 | 0 | 9 | 3 |
| 19 | 81 | 41 | 8 | 7 |
| 20 | 33 | 50 | 4 | 5 |
| 21 | 76 | 12 | 7 | 4 |
| 22 | IN | | 3 | 3 |
| 23 | IN | | 8 | 6 |
| 24 | 42 | 33 | 3 | 2 |
| 25 | IN | | 2 | 1 |
| 26 | IN | | 0 | 0 |
| 27 | IN | | 6 | 4 |

Example 33

The compounds of the invention were also tested as insecticides against confused flour beetles and houseflies. Some of the compounds show fair insecticide activity. In the test against confused flour beetles the candidate compound was dissolved in acetone (1 mg./liter), placed in a Syracuse staining dish and the acetone evaporated. Confused flour beetles were placed into the dish and the dish covered with a muslin screen. Mortality observations were made at intervals of 2 and 18 hours and the results were corrected for natural mortality.

The test with houseflies was similar except that an 8 ounce wide mouth jar was employed and the jars containing the acetone solution of the compound were placed on a roller evaporator and the acetone evaporated to leave a dry film of the candidate compound on the jar surface. After the flies were placed in a jar a cotton pad soaked in a 10% sugar solution as a food source was placed on the screen top which served as a cover for the jar. Mortality observations were made at intervals of 2 and 18 hours and the results were corrected for natural mortality. In the tests the results are recorded in Table 6 as percent mortality and the concentrations are reported as mg. of compound per dish for the flour beetles and mg. of compound per jar for houseflies.

The compound of Example 11 also showed 5% beetle kill at 10 mg./dish after 18 hours and the compounds of Examples 18 and 23 showed 3% housefly kill at 10 mg./jar after 18 hours.

The compounds of Examples 13 and 5 showed particularly good defoliant-desiccant activity. The activity of the compound of Example 5 (S,S-dibutyl S-1,2,2-trichloroethyl phosphate) was particularly surprising since the corresponding 2,2,2-trichloroethyl isomer of Example 27 was inactive. In the unsaturated series the compound of

TABLE 6

| Compound of example | Hours | Flour beetle | | Housefly | |
|---|---|---|---|---|---|
| | | 1,000 | 100 | 1,000 | 100 |
| 2 | 18 | 34 | 0 | 20 | 0 |
| 3 | 18 | | | | |
| 4 | 18 | 16 | 0 | 90 | 3 |
| 5 | 18 | 100 | 0 | 56 | 0 |
| 6 | 18 | | | | |
| 7 | 18 | | | | |
| 8 | 18 | 25 | 0 | 16 | 0 |
| 10 | 2 | 15 | 0 | | |
| | 18 | 85 | 15 | | |
| 11 | 2 | 85 | 15 | | |
| | 18 | 100 | 15 | | |
| 12 | 2 | 0 | 0 | 60 | 0 |
| | 18 | 0 | 0 | 100 | 0 |
| 13 | 18 | | | | |
| 14 | 2 | 0 | 0 | 6 | 0 |
| | 18 | 19 | 0 | 40 | 0 |
| 15 | 18 | 16 | 0 | | |
| 16 | 18 | 36 | 16 | 3 | 0 |
| 18 | 2 | 46 | 0 | 6 | 0 |
| | 18 | 73 | 3 | 50 | 6 |
| 19 | 2 | 41 | 0 | 0 | 0 |
| | 18 | 100 | 0 | 25 | 0 |
| 20 | 18 | 50 | 0 | 0 | 0 |
| 21 | 18 | 6 | 0 | 0 | 0 |
| 22 | 18 | | | | |
| 23 | 2 | 0 | 0 | 3 | 0 |
| | 18 | 35 | 0 | 3 | 3 |
| 24 | 18 | | | | |
| 25 | 2 | 100 | 0 | 0 | 0 |
| | 18 | 100 | 0 | 3 | 0 |
| 26 | 18 | | | | |
| 27 | 2 | 0 | 0 | 20 | 0 |
| | 18 | 63 | 0 | 56 | 0 |

Example 19 was the best defoliant and desiccant. The compound of Example 23 surprisingly was a good desiccant but inactive as a defoliant.

Some of the compounds were also good nematocides. The compounds of Examples 10 and 11 showed the best nematocidal activity in the tests against saprophytic nematodes.

The compounds of the present invention have relatively low mammalian toxicity. This of course is an important consideration in the commercial use of defoliants, desiccants and pesticides.

I claim:
1. A compound having the formula

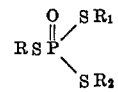

where R is trihaloethyl or dihalovinyl, where the halogen is chlorine or bromine and $R_1$ and $R_2$ are lower alkyl, phenyl, tolyl, chloro lower alkyl, nitrophenyl, methoxyphenyl, ethoxyphenyl, lower alkylthio lower alkyl or $R_1$ and $R_2$ together are a divalent alkylene chain and are joined with the two sulfur atoms and phosphorus atom to form a 5 to 6 member ring.

2. A compound according to claim 1 wherein R is 1,2,2-trichloroethyl and $R_1$ and $R_2$ are both lower alkyl.

3. A compound according to claim 1 which is S,S-dimethyl-S-1,2,2-trichloroethyl phosphate.

4. A compound according to claim 1 which is S,S,-diethyl-S-1,2,2-trichloroethyl phosphate.

5. A compound according to claim 1 which is S,S-di-n-butyl-S-1,2,2-trichloroethylphosphate.

6. A compound according to claim 1 wherein R is 2,2,2-trichloroethyl and $R_1$ and $R_2$ are both lower alkyl.

7. A compound according to claim 1 which is S,S,-dimethyl-S-2,2,2-trichloroethyl phosphate.

8. A compound according to claim 1 which is S,S,-diethyl-S-2,2,2-trichloroethyl phosphate.

9. A compound according to claim 1 which is S,S-diisopropyl-S-2,2,2-trichloroethyl phosphate.

10. A compound according to claim 1 wherein R is dichlorovinyl.

11. A compound according to claim 1 wherein R is 2,2-dichlorovinyl and $R_1$ and $R_2$ are lower alkyl.

12. A compound according to claim 1 which is S,S-diethyl-S-2,2-dichlorovinyl phosphate.

13. A compound according to claim 1 having the formula

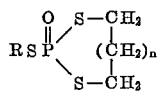

where $n$ is 0 or 1.

14. A compound according to claim 13 which is S,S-ethylene-(1,2)-S-2,2,2-trichloroethyl phosphate.

15. A compound according to claim 1 where $R_1$ and $R_2$ are lower alkylthio lower alkyl.

References Cited
UNITED STATES PATENTS

| | | |
|---|---|---|
| 2,965,467 | 12/1960 | Markley. |
| 3,093,536 | 6/1963 | Loeffler _____ 260—957 XR |
| 3,116,201 | 12/1963 | Whetstone et al. __ 260—957 XR |
| 3,184,377 | 5/1965 | Hensel et al. |

CHARLES B. PARKER, Primary Examiner

ANTON H. SUTTO, Assistant Examiner

U.S. Cl. X.R.

71—71, 87; 424—209, 215, 219, 224; 260—948, 951, 954, 957, 963, 965